United States Patent [19]

Houseman

[11] Patent Number: 4,905,818
[45] Date of Patent: Mar. 6, 1990

[54] SINGLE GRIPPER CONVEYOR SYSTEM

[75] Inventor: J. D. Houseman, Lake Saint Louis, Mo.

[73] Assignee: Quipp Incorporated, Miami, Fla.

[21] Appl. No.: 136,744

[22] Filed: Dec. 21, 1987

Related U.S. Application Data

[62] Division of Ser. No. 831,186, Feb. 20, 1986, Pat. No. 4,746,007.

[51] Int. Cl.⁴ .............................................. B65G 29/00
[52] U.S. Cl. ............................... 198/803.7; 198/470.1; 271/204
[58] Field of Search ...................... 198/470.1, 461, 462, 198/803.7, 803.9; 271/277, 204, 184

[56] References Cited

U.S. PATENT DOCUMENTS

| | | | |
|---|---|---|---|
| 4,201,286 | 5/1980 | Meier | 198/461 |
| 4,333,559 | 6/1982 | Reist | 198/461 |
| 4,381,056 | 4/1983 | Eberle | 198/803.7 |
| 4,512,457 | 4/1985 | Reist et al. | 198/470.1 |
| 4,550,822 | 11/1985 | Meier | 198/461 |
| 4,556,687 | 1/1986 | Faltin | 271/277 X |
| 4,604,851 | 8/1986 | Reist | 271/204 X |
| 4,638,906 | 1/1987 | Winiasz | 198/803.9 |
| 4,666,143 | 5/1987 | Reist | 271/204 |

*Primary Examiner*—Robert J. Spar
*Assistant Examiner*—Cheryl Gastineau
*Attorney, Agent, or Firm*—Louis Weinstein

[57] ABSTRACT

Gripper assemblies are moved past a pick-up station by a chain conveyor. A conveyor overlapping signature stream moves past the pick-up station beneath the gripper assemblies at a faster linear velocity whereby the leading edge of each signature enters into the open jaws of a gripper assembly. A closing cam closes the cooperating gripper jaws which firmly grip the leading end of the signature as the gripper assemblies enter a curved path thereby abruptly accelerating the gripped signature and the next upstream signature resting thereon to facilitate and enhance its entry into the region between the open gripper jaws of the next upstream gripper assembly. The signature stream is delivered to the pick-up station by a conveyor having a cooperating vacuum source for retaining the signatures in proper alignment upon the conveyor belt as they approach the pick-up station, the vacuum condition terminating before the signatures are gripped by the jaws of a gripper assembly. Each gripper assembly includes a wrap spring which normally holds the gripper jaws closed and which is activated when a gripper assembly release ring engages an opening cam preparatory to receipt of a signature. A closing lever lifts the opened jaw, by engagement of its roller with a closing cam to firmly grip the signature therebetween. After the gripper jaws open, they are maintained open by the spring wrap clutch, enabling gripper assemblies to be slectively released at the drop station, if desired. Signatures are dropped at a drop station by engaging the release ring with an opening cam to drop the signatures onto a receiving conveyor.

20 Claims, 13 Drawing Sheets

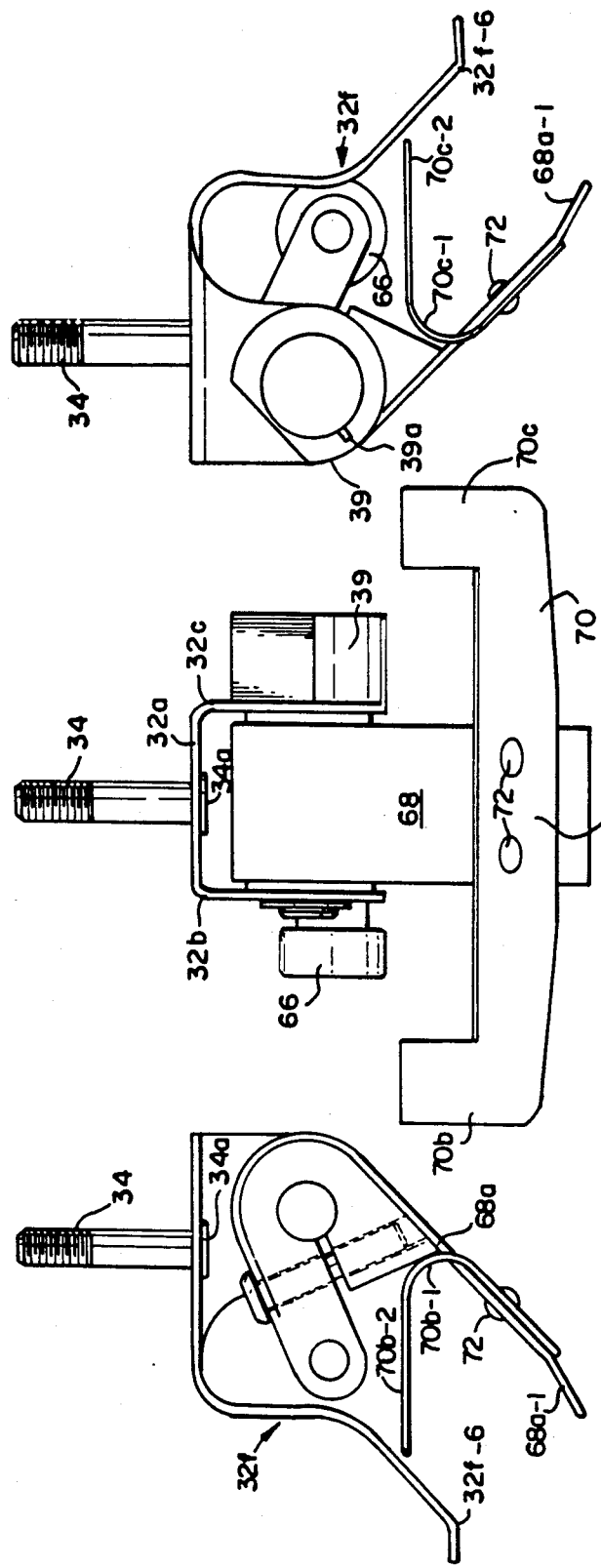

SINGLE GRIPPER CONVEYOR SYSTEM

This is a division of application Ser. No. 831,186, filed Feb. 20, 1986, now U.S. Pat. No. 4,746,007.

FIELD OF THE INVENTION

The present invention relates to gripper assemblies and more particularly to a novel chain link and gripper assembly for use in signature handling systems and including signature pick-up and signature drop stations designed to respectively facilitate the pick-up and drop operations.

BACKGROUND OF THE INVENTION

Gripper systems are typically utilized by newspaper publishers for conveying a signature stream from one location to another, especially when it is either impractical or inconvenient to move the signatures through the use of conveyor belts or the like. It is important however to provide a conveyor assembly having grippers capable of rapidly opening and closing and of remaining in the open position to facilitate the pick-up and selective drop-off of signatures.

BRIEF DESCRIPTION OF THE INVENTION

The signature conveyor system of the present invention is characterized by comprising a conveyor chain formed of identical interconnected links having horizontally and vertically aligned guide rollers guiding the chain conveyor through a guide track which may be curved in mutually perpendicular directions due to the unique design of the links which are comprised of unitary bodies each having a pivot ball imbedded therein for receiving and swingably mounting a roller shaft which rotatably supports a pair of vertically aligned rollers as well as coupling two adjacent links.

Each link is provided with mounting means for receiving and securely mounting a gripper assembly thereto. Each gripper assembly is provided with a pair of cooperating jaws including a movable jaw swingable between an open and a closed position. A wrap spring normally locks the movable jaw to the gripper assembly frame to prevent the gripper jaws from opening. A release ring unlocks the wrap spring from the movable jaw when engaged by an opening cam. The roller provided at the end of a gripper assembly lever arm thereafter engages a closing cam which lifts the swingable arm to the clamped position after the leading edge of a signature has moved between the open gripper jaws. The wrap spring permits relative unimpeded closing movement of the swingable jaw when the lever arm roller is engaged by a closing cam. The wrap spring otherwise retains the swingable jaw in the open position once it has opened, which facilitates selective drop-off of signatures.

The conveyor chain moves the gripper assemblies through a pick-up station arranged above a conveyor belt which delivers a stream of signatures toward the pick-up station. The signatures on the conveyor move more rapidly than the conveyor chain, causing the leading edge of each signature to enter between the jaws of a gripper assembly which have been opened by an opening cam located just ahead of a closing cam also provided at the pick-up station. Just beyond the pick-up station, the conveyor track guides the chain through a curved path, causing the associated gripper assemblies to accelerate whereupon the signature being moved by the accelerated gripper assemblies cause the adjacent upstream signatures resting upon the accelerated signatures likewise to be accelerated to assure positive movement of the following signature in the region between the open jaws of the next following gripping assembly.

In order to further facilitate positive pick-up of the signatures, the conveyor belt assembly which conveys signatures to the pick-up station is provided with vacuum means causing the signatures to be drawn against the conveyor belt and thereby assist the signatures in maintaining belt conveyor speed especially when resting on an early arriving preceeding signature which has assumed gripper speed, i.e. has slowed down from conveyor speed to gripper speed. The vacuum condition terminates just prior to the pick-up of the signature as it reaches the pick-up station. A closing cam engages the lift arm roller as soon as the leading edge of the signature has moved between the open jaws enabling the gripper assembly to convey the signature to the drop station along any desired path dependent upon the needs of the particular application.

The drop station is provided with an opening cam which urges the release ring to move the swingable jaw to the open position, releasing the gripped signature and allowing it to drop upon a receiving surface, such as a conveyor. The opening cam may be a reciprocating assembly selectively operated by a solenoid or an air cylinder for releasing only selected ones of the gripped signatures.

OBJECTS OF THE INVENTION AND BRIEF DESCRIPTION OF THE FIGURES

It is therefore one object of the present invention to provide novel gripper assemblies for selectively gripping signatures and the like and including a swingable jaw normally locked against movement by a wrap spring and including a release ring for releasing the wrap spring, enabling the swingable jaw to move to the open position and a lever arm for moving the swingable jaw against a light holding force exerted by the wrap spring to the closed position, when respectively engaged by opening and closing cams.

Still another object of the present invention is to provide a novel gripper conveyor assembly and means for moving the gripper assembly along a curved path immediately after pick-up of a signature from a delivering conveyor to facilitate delivery of the next upstream signature to the next upstream assembly due to the acceleration imparted to the next upstream signature resting upon the gripped signature.

Still another object of the present invention is to provide a novel gripper conveyor system including vacuum means for positively advancing and maintaining a signature stream delivered to the conveyor system in proper alignment as the signature stream is advanced to the pick-up station.

The above as well as other objects of the present invention will become apparent when reading the accompanying description and drawing in which:

FIG. 1 shows a plan view of several links of a signature conveyor assembly conveyor chain embodying the principles of the present invention.

FIGS. 2a and 2b respectively show top and side elevational views of one of the links shown in FIG. 1.

FIG. 3a is a front elevational view of a gripper assembly.

FIG. 3b is a side elevational view of the gripper assembly of FIG. 3a.

FIG. 3c is a side elevational view of the opposite side of the gripper assembly not shown in FIG. 3b with the cam follower and frame side removed for clarity.

FIG. 6c shows a top plan view of the signature stream conveyor of FIG. 6a.

FIG. 7b shows a front elevational view of the drop station of FIG. 7a.

DETAILED DESCRIPTION OF THE INVENTION AND PREFERRED EMBODIMENTS THEREOF

Figure 1:
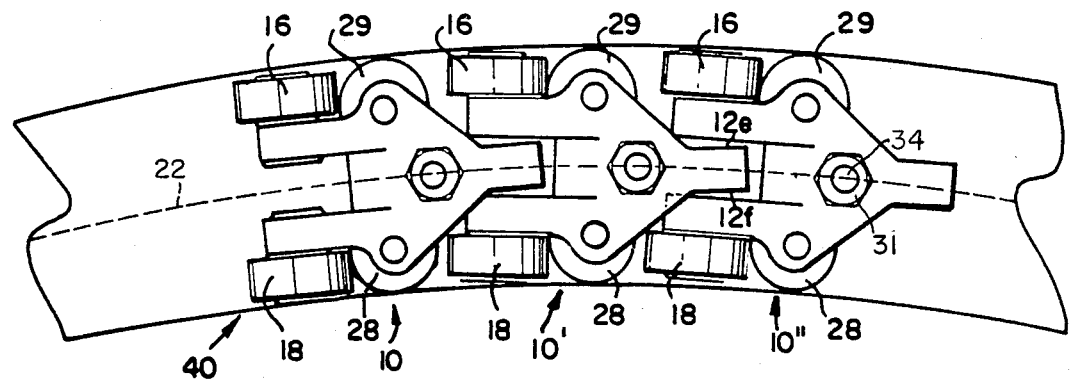

FIG. 1 shows a gripper assembly comprised of several identical interconnected links 10. Although the conveyor chain is typically comprised of a large number of interconnected links, said links have been omitted for the purposes of simplicity. One interconnecting link 10 is shown in FIGS. 2a through 2g and is comprised of a unitary main body 12 with integral projection 12a extending in a first direction and a pair of bifurcated arms 12b and 12c extending in a second direction. Each of the arms 12b, 12c is provided with an opening for receiving a roller shaft 14 which rotatably supports vertically aligned rollers 16, 18. Integral arm 12a has a socket-like opening 12d. A pivot ball 20 is arranged within socket 12d and is freely movable in socket 12d. Pivot ball 20 is provided with an opening 20a which receives the roller shaft 14 of adjacent link 10' which is joined thereto in the manner shown best in FIG. 1. Tapered projections 12e and 12f integral with arms 12b and 12c extend toward the projection of the link connected thereto and engage the adjacent sides 20c, 20d of pivot ball 20 and further act to center arm 12a and space the arm 12a from the confronting surfaces 12g and 12h of integral arms 12b and 12c to permit links to experience swingable movement relative to one another so as to be capable of following a curved path shown, for example, by dotted line 22 in FIG. 1. The radius of curvature of path 22 is limited only by engagement of the vertically aligned rollers 16, 18 with guide walls of the adjacent interconnected link. The unitary body 12, which is preferably a molded member, provides a rugged, positive and yet smooth swivel socket for pivot ball 20, which is molded into body 12. The body 12 is molded of a suitable plastic material, which may, for example, be a fiber reinforced plastic material such as nylon containing glass fibers. The pivot ball 20 is preferably a metallic member, such as steel.

Figure 2A:
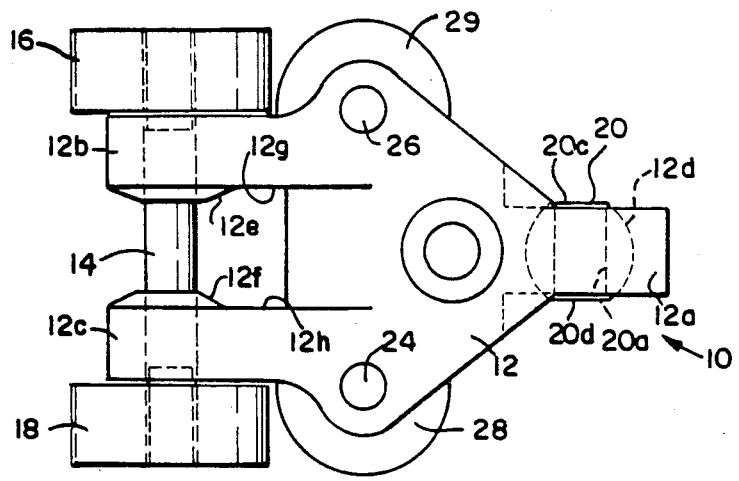
FIGS. 2c and 2d show side and bottom plan views respectively, of the link in FIGS. 2a and 2b with the rollers removed.
FIGS. 2e, 2f and 2g show sectional views of a conveyor link looking in the direction of arrows A—A of FIG. 2d; B—B of FIG. 2c; and C—C of FIG. 2d, FIG. 2g showing a gripper assembly mounted to the link, the gripper assembly having its one side of the frame removed for clarity.
Figure 2B:
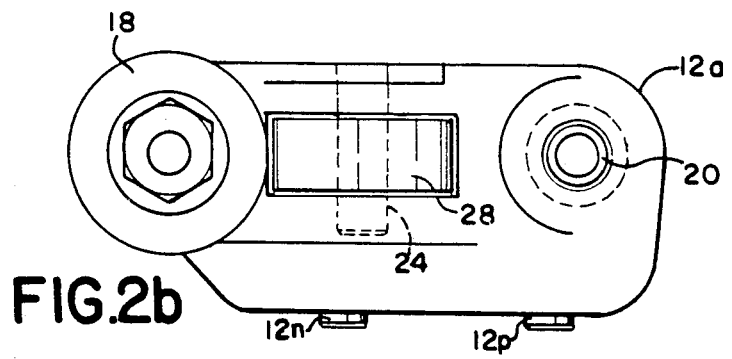
Figure 2C:
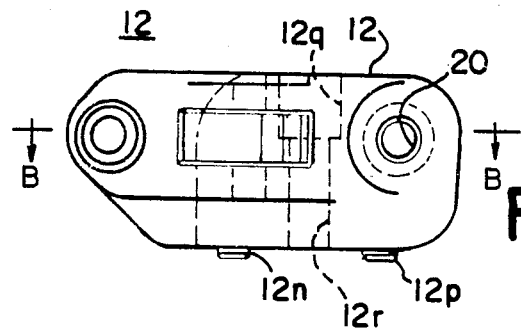
Figure 2D:
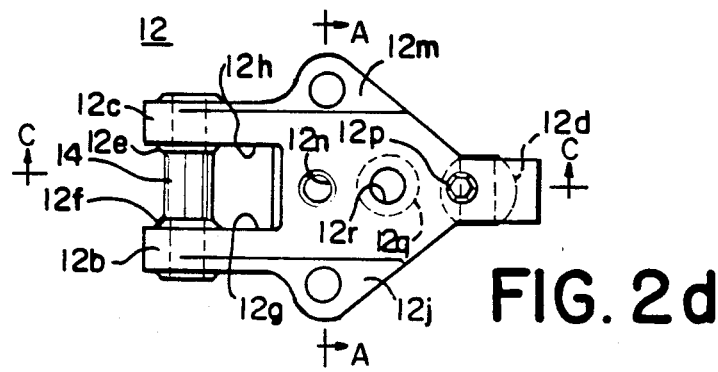
Figure 2E:
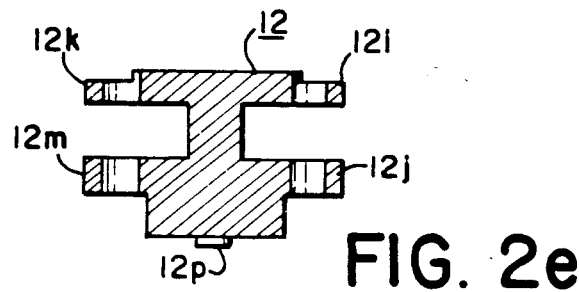
Figure 2F:
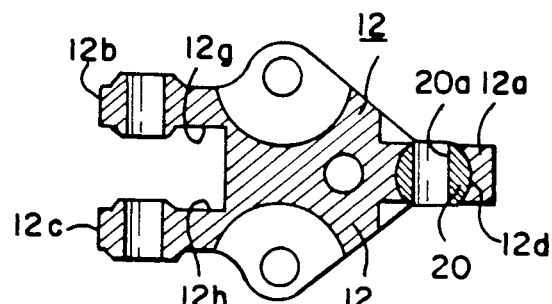

Each link 10 is further provided with first and second pairs of integral arms 12i-12j and 12k-12m, shown best in FIG. 2e, each of the arms being provided with openings for receiving an associated roller pin 24, 26 (note especially FIGS. 2a and 2b) which pins are press fitted into the openings of the associated integral arm pairs for freewheelingly supporting horizontally aligned rollers 28, 29. It should be understood that rollers 18, 16, 28 and 29 are preferably provided with roller bearings (not shown for purposes of simplicity).

The manner in which the vertically (18, 16) and horizontally (28, 29) aligned rollers guide the chain will be described hereinbelow in connection with FIGS. 1 and 8a, for example.

Each link 10 is further provided with a vertically aligned bore having a large diameter upper bore portion 12q and a smaller diameter lower bore portion 12r which cooperatively define shoulder 12s. The bore receives a threaded rod 34 forming an integral part of the gripper assembly 30 (see FIG. 2) which extends through said lower bore 12r and into upper bore 12q. A fastening nut 31 threadedly engages the gripper assembly threaded rod and secures the gripper assembly to the link as shown best in FIG. 2g. A pair of integral projections 12n and 12p extend downwardly from body 12 of link 10 and through suitable openings (to be more fully described) in the gripper assembly 30 to properly align the gripper assembly 30 upon link 10.

It should be understood that the conveyor chain may be utilized to support and move other members employed to convey products. For example, hooks, platforms, containers and other product supporting members may be provided with a threaded member or the like which is coupled to a link 10 in a manner similar to a gripper assembly 30.

Figure 8A:
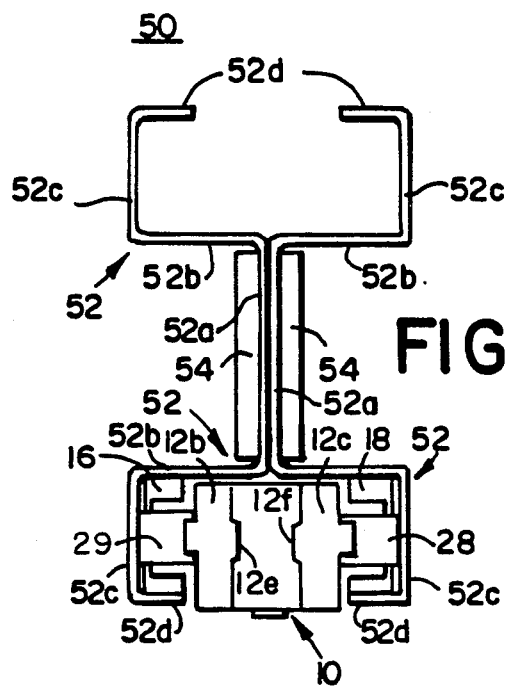
FIGS. 8a through 8c show sectional views of the track used to guide the conveyor chain.
Figure 8B:
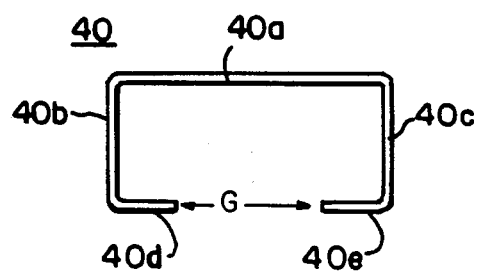

The conveyor chain is guided by a track shown, for example, in FIGS. 1 and 8a through 8c. FIG. 8b shows a cross section of a unitary track having a substantially C-shaped configuration defined by main portion 40a having downwardly depending integral arms 40b and 40c which are bent inwardly to form short arms 40d and 40e which define a gap space G therebetween. The embodiment 42 of FIG. 8c differs from that shown in FIG. 8b in that the embodiment 42 is formed of two substantially U-shaped members 44 and 46 each having yoke portions 44a and 46a with inwardly extending integral arms 44b, 44c and 46b, 46c. Arms 44b, 46b are integrally joined, such as, for example, by welding, to plate 48, while the free ends of arms 44c, 46c define a gap space G similar to that shown in FIG. 8b.

FIG. 8a shows an end view of a carry and return track assembly 50 comprised of 4 substantially identical elements 52 each having joining portions 52a and integral substantially J-shaped portions defined by portions 52b, 52c and 52d. Four (4) portions 52a are joined together, such as, for example, by welding, to form carry and return track portions, said arm portions being welded to one another and to outer plates 54,54. Two adjacent pairs of the portions 52b form the "closed" end of the carry and return track sections while portions 52c form the sidewalls thereof and pairs of the portions 52d form the "open" end of the track with the free ends thereof defining the gap space G through which a portion of each chain link extends.

Noting, for example, FIG. 8a the lower portion thereof shows a typical link 10 arranged within the lower track section. The vertically aligned rollers 16, 18 rollingly engage the inner surfaces of portions 52b-52d. The horizontally aligned rollers 28 and 29 rollingly engage the inner surfaces of portions 52b. FIG. 1 shows the manner in which the horizontally aligned rollers 28 engage the inner run of the track 40, it being understood that the rollers 29 are slightly spaced from the outer run of the track 40. However, rollers 29 will rollingly engage the inner run of the track when moving through a track having a curvature reverse that shown in FIG. 1. It can thus be seen that the design of the track 40 greatly simplifies and facilitates both its fabrication and assembly.

The gripper assemblies 30 mounted to each link 10 are substantially identical to one another in design and operation. Thus, only one such assembly 30 will be described herein for purposes of simplicity. As shown best in FIGS. 2g and 3a through 3d, assembly 30 is comprised of frame 32 having a U-shaped portion comprised of yoke 32a and integral, downwardly depending arms 32b and 32c. Yoke portion 32a is provided with openings for receiving the positioning projections 12n and 12p of a link 10 as shown best in FIG. 2g, and a third opening for receiving threaded fastening rod 34, whose lower end is provided with head portion 34a which is secured to yoke portion 32a. Arms 32b and 32c are respectively provided with rectangular opening 32d and circular opening 32e. Opening 32e receives a clutch bushing 33 shown in FIGS. 4c and 4d and which is provided with a cylindrical-shaped projection 33 surrounded at its left-hand end with a square-shaped portion 33b arranged between cylindrical projection 34a and flange 33c.

Figure 3D:
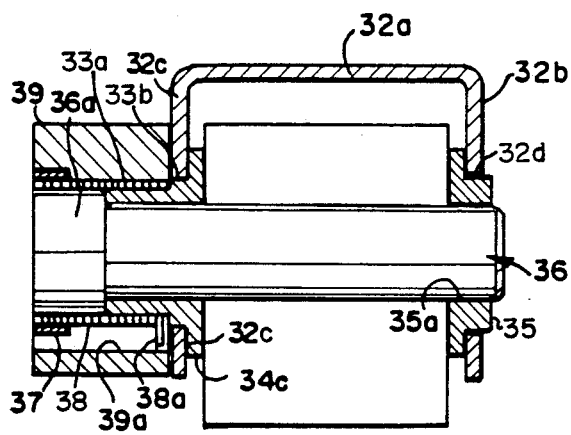
FIG. 3d is a sectional view of the gripper assembly wrap spring and release ring.
Figure 3E:
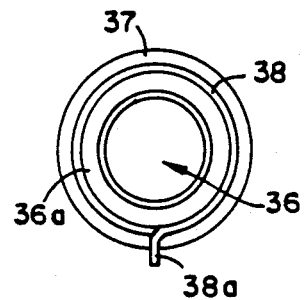
FIG. 3e shows an end view of the movable jaw and lift roller shaft assembly and encircling wrap spring.
Figure 3F:
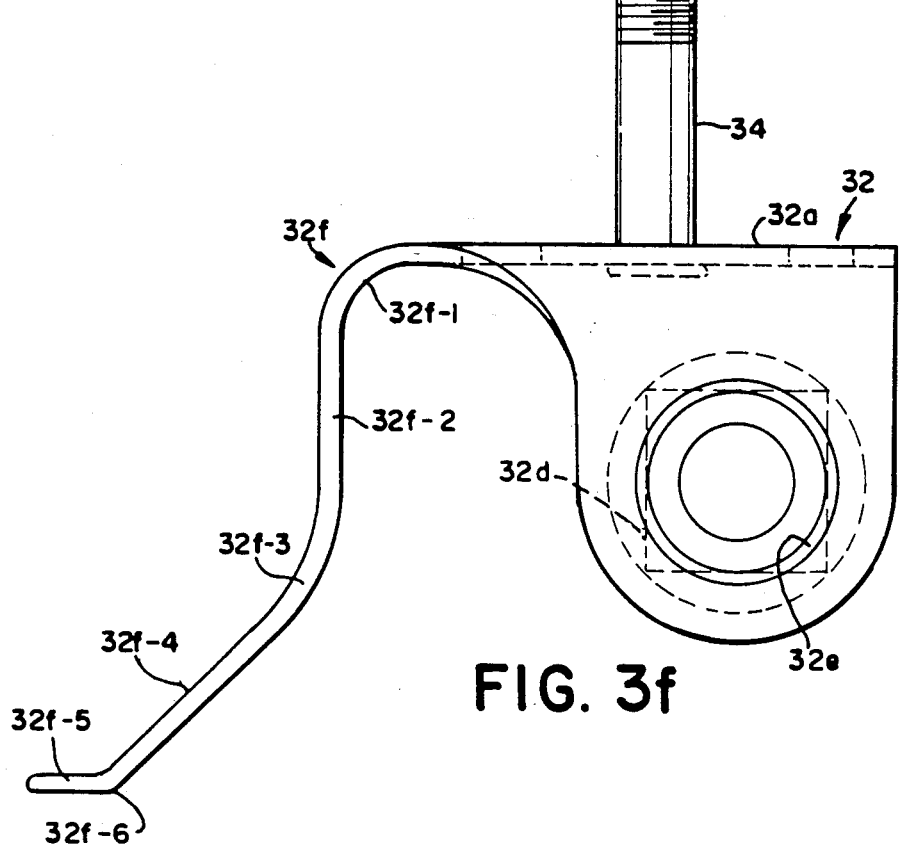
FIG. 3f is an elevational view of the gripper assembly frame.
Figure 4A:
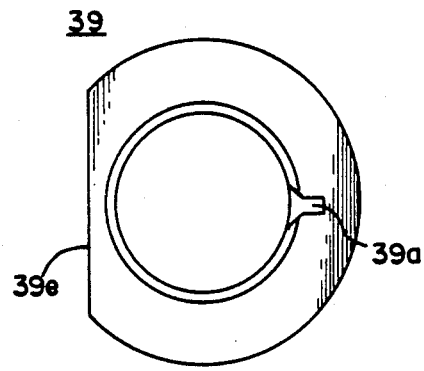
FIGS. 4a and 4b show top plan and sectional views of the release ring utilized for releasing the wrap spring from the gripper assembly jaw supporting shaft.
Figure 4B:
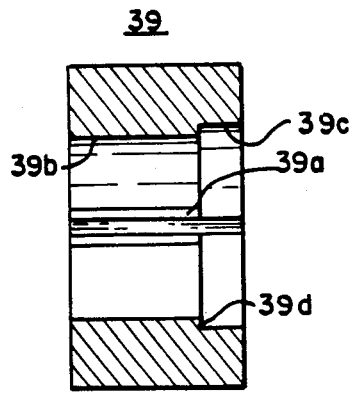
Figure 4C:
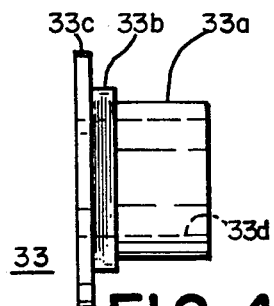
FIGS. 4c and 4d are side and front views respectively of the clutch bushing inserted within the angular opening provided in the gripper frame shown in FIG. 3.
Figure 4D:
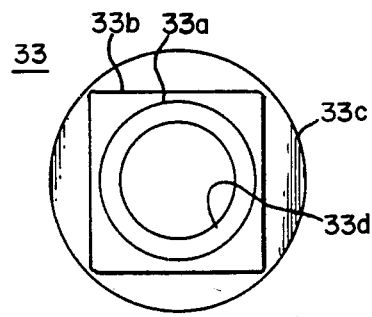

FIG. 3d shows a portion of the gripper frame assembly with a circular-shaped bushing 35 arranged within circular opening 32e and bushing 33, shown also in FIGS. 4c and 4d, mounted within arm 42c so that the rectangular portion 33b of bushing 33 extends into rectangular-shaped opening 42d and with the flange 33c engaging the interior surface of arm 32c and with cylindrical portion 33 extending outwardly through and beyond arm 32c.

An elongated shaft 36 extends through the central opening 33d in clutch bushing 33 as well as the central opening 35a in bushing 35. Shaft 36 has an enlarged head portion 36a. The left-hand portion of a wrap spring 38 is wrapped around head portion 36a. Cylindrical-shaped ring shaft cap 37 is force fitted upon the left-hand portion of wrap spring 38 and firmly secures the left-hand portion of wrap spring 38 to head portion 36a, as well as retaining release ring 39 in place, as will be described hereinbelow. The right-hand portion of wrap spring 38 encircles the cylindrical portion 33 of clutch bushing 33. The right-hand portion of wrap spring 38 is normally tightly wrapped about cylindrical portion 33 of bushing 33, substantially locking shaft 36 against movement in one direction while exerting a light holding force upon shaft 36 when rotated in the opposite direction. The extreme right-hand end of wrap spring 38 terminates in a radially aligned portion 38a which projects into a radially aligned slot 39a provided in release ring 39, shown best in FIGS. 3d, 4a and 4b. The central opening through release ring 39 is provided with a smaller diameter portion 39b and a larger diameter portion 39c which defines shoulder 39d therebetween. Ring shaft cap 37 fits into larger diameter portion 39c and one edge thereof rests against shoulder 39b to retain release ring 39 upon shaft 36. Release ring 39 is further provided with a cam surface 39e which is slidably engaged by a releasing cam surface to be more fully described to move the swingable jaw 68 to the open position, as will be more fully described hereinbelow.

It is sufficient for the present to understand that wrap spring 38, which has a first portion thereof substantially secured to shaft head 36a, normally wraps tightly about portion 33 of clutch bushing 33, preventing shaft 36 from moving in a first (opening) direction relative to clutch bushing 33 and hence relative to gripper assembly frame 32. Upon engagement of cam surface 39e of release ring 39 by an engaging cam surface (to be described hereinbelow), ring 39 is rotated in a direction to cause the right-hand portion of wrap spring 38 to be loosened about cylindrical portion projection 33. This is accomplished by release ring 39, whose radial slot 39a engages the free end 38a of wrap spring 38, moving projection 38a, thereby causing the wrap spring to become sufficiently unwrapped or loosened from cylindrical projection 33 to permit relative movement between clutch bushing 33 and shaft 36. The swingable jaw assembly, to be more fully described, being mounted upon shaft 36, is now free to move to the open position.

The gripper assembly frame 32 is further provided with a curved extension 32f which is integral with yoke 32a and which defines the stationary jaw 32f of the gripper assembly. Stationary jaw 32f curves downwardly from yoke 32a at 32f-1, has a substantially linear portion 32f-2 and curves outwardly at 32f-3 and has a second substantially linear portion 32f-4 whose lower end is bent outwardly to form the gripping foot 32f-5 which cooperates with the movable jaw 68 to firmly grip a signature when in the closed position.

Figure 2G:
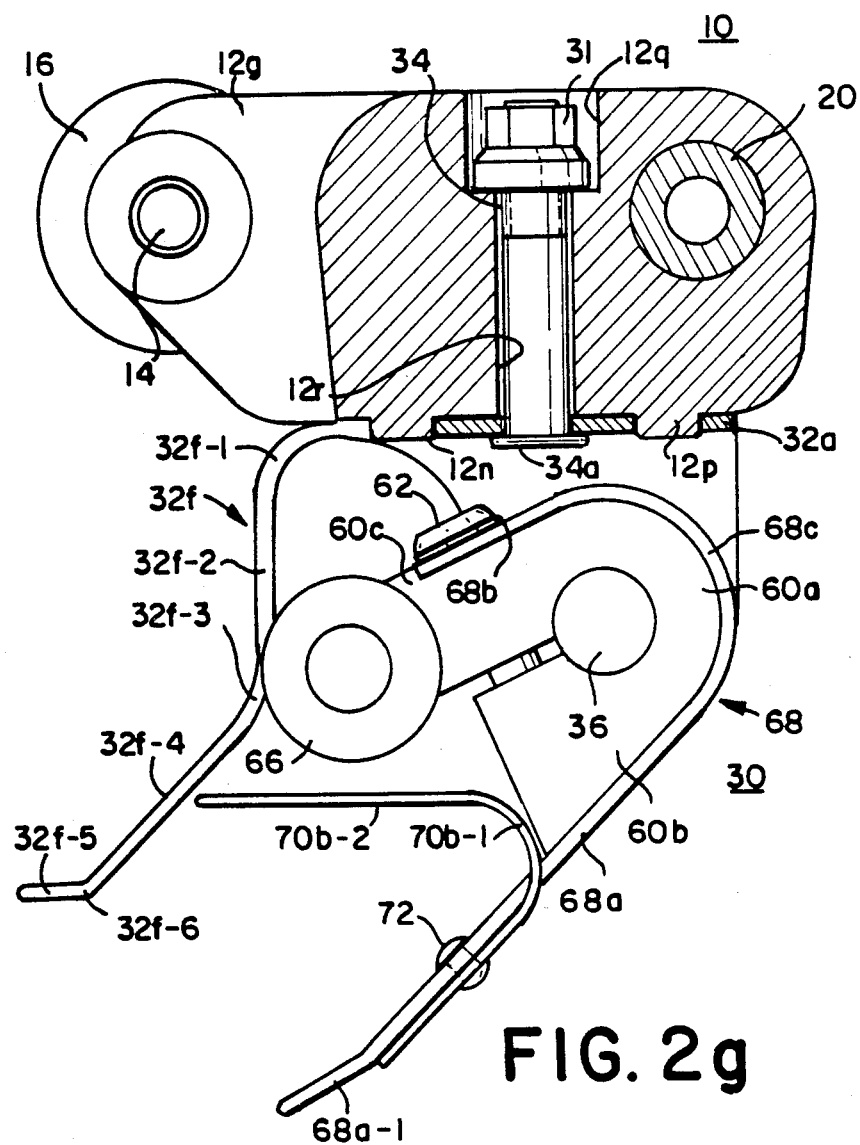
Figure 5A:
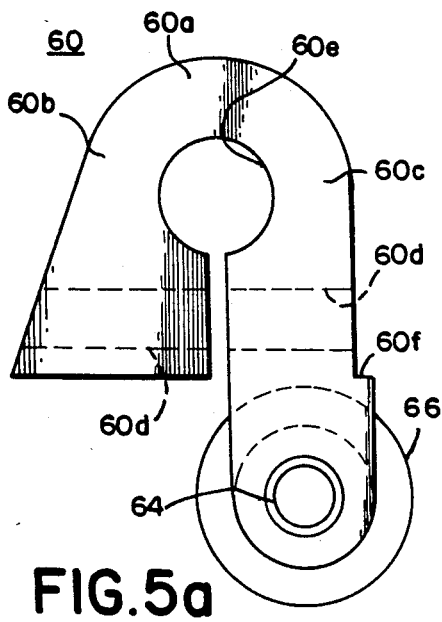
FIGS. 5a and 5b shows side and end views of the lever assembly employed in the gripper assembly of FIGS. 3a, 3b and 3c.
Figure 5B:
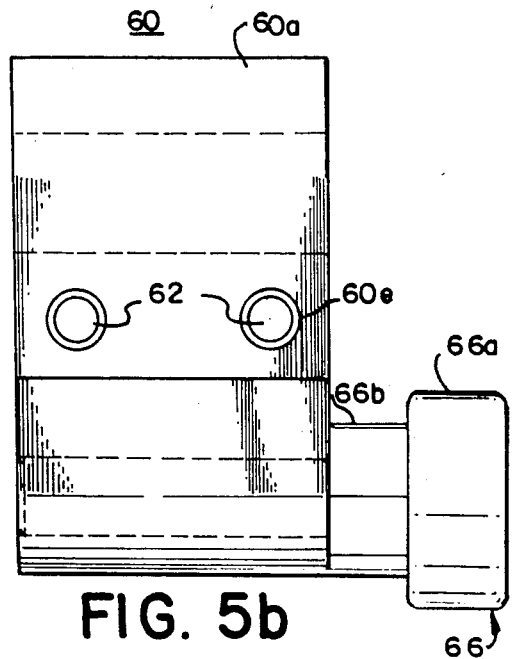

Shaft 36 rotatably supports the movable jaw and lever assembly 60 shown best, for example, in FIGS. 2g, 5a and 5b and which is comprised of a yoke portion 60a which is bifurcated to form arms 60b, 60c. Openings 60d, 60e in arms 60b, 60c receive a fastener 62 which draws arms 60b, 60c together to tighten central opening 60e about shaft 36. A shaft 64 rotatably mounts roller 66 to the free end of arm 60c. Roller 66 is provided with a roller portion 66a of larger diameter and an extension 66b of reduced diameter. Roller 66 cooperates with a closing cam for closing the gripper assembly in a manner to be more fully described. The lever assembly may alternatively be a solid one-piece member having an opening 60e force-fittingly receiving shaft 36 which is preferably knurled to enhance the force fit.

The movable lower jaw 68 is joined to lever 66 and is a substantially J-shaped member formed of a springy metal having a longer arm 68a and a shorter arm 68b integrally joined to a curved yoke portion 68c. Fastener 62 joins shorter arm 68b to arm 60c, allowing arm 68a to experience some flexing. The free end of short arm 68b rests against shoulder 60f provided along the outer surface of lever arm 60c. Lower jaw 68 is further comprised of an elongated, flexible, U-shaped plate 70 whose central portion 70a is joined to the underside of long-arm 68a (see FIGS. 3a-3c) by rivets 72. Member 70 extends outwardly in opposite directions from lower jaw 68 and is provided with two integral arm portions 70b, 70c extending substantially perpendicular to central portion 70a, the intermediate portion of each arm being bent to form curved portions 70b-1, 70c-1 (see FIG. 3b and 3c) and terminating in a straight portion 70b-2, 70c-2. The curved portions 70b-1, 70c-1 cooperate to limit the depth of penetration of the leading edge of a signature into the region between open jaws 32f and 68 and further act to align the signature within the gripper to prevent skewing. The free end 68a-1 of arm 68 is bent so as to be slightly off-set and diagonally aligned relative to the remainder of arm 68a and is designed to be positioned adjacent to the bend line 32f-6 (see FIGS. 3c and 7a) when the gripper assembly is in the closed position.

With the gripper assembly in the open position as shown, for example, in FIGS. 3b and 3c, the curved and free end portions of arms 70b and 70c bridge the region between the open jaws 68 and 32f to guide and properly align the folded leading edge of a signature into the region between said jaws. Since the signature is moving at a greater velocity than the gripper assembly as they collectively pass through the pick-up station, the leading edge of the signature is urged into the region between the open jaws and ultimately engages the arms 70b, 70c. Further movement of the signature is limited when its leading edge engages curved portions 70b-1, 70c-1 thus limiting further movement of the signature into the region between the jaws and also aligning the signature.

Figure 6A:
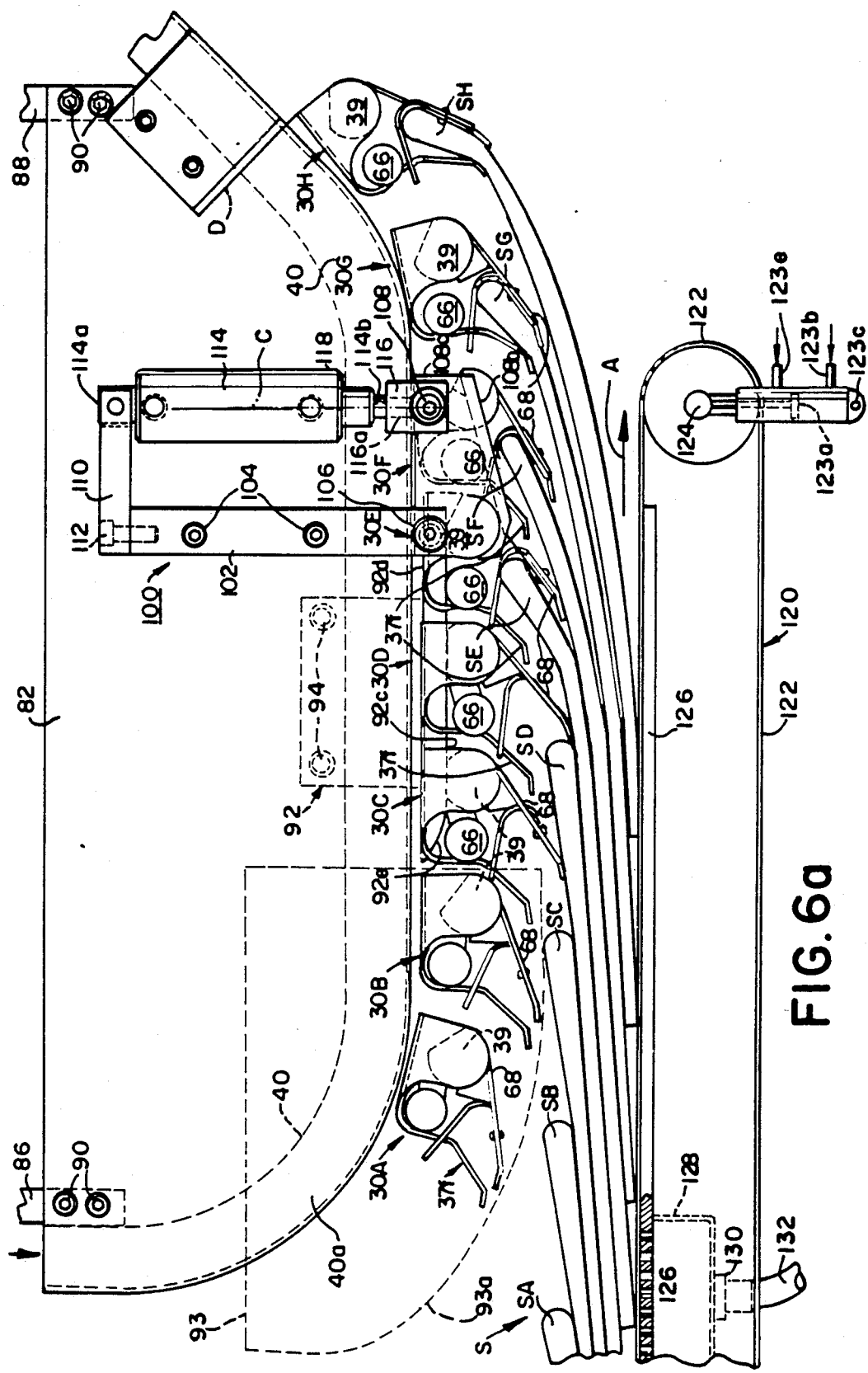
FIG. 6a shows an elevational view of a portion of a pick-up station employing the conveyor chain and gripper assemblies of FIGS. 1 through 5.
Figure 6B:
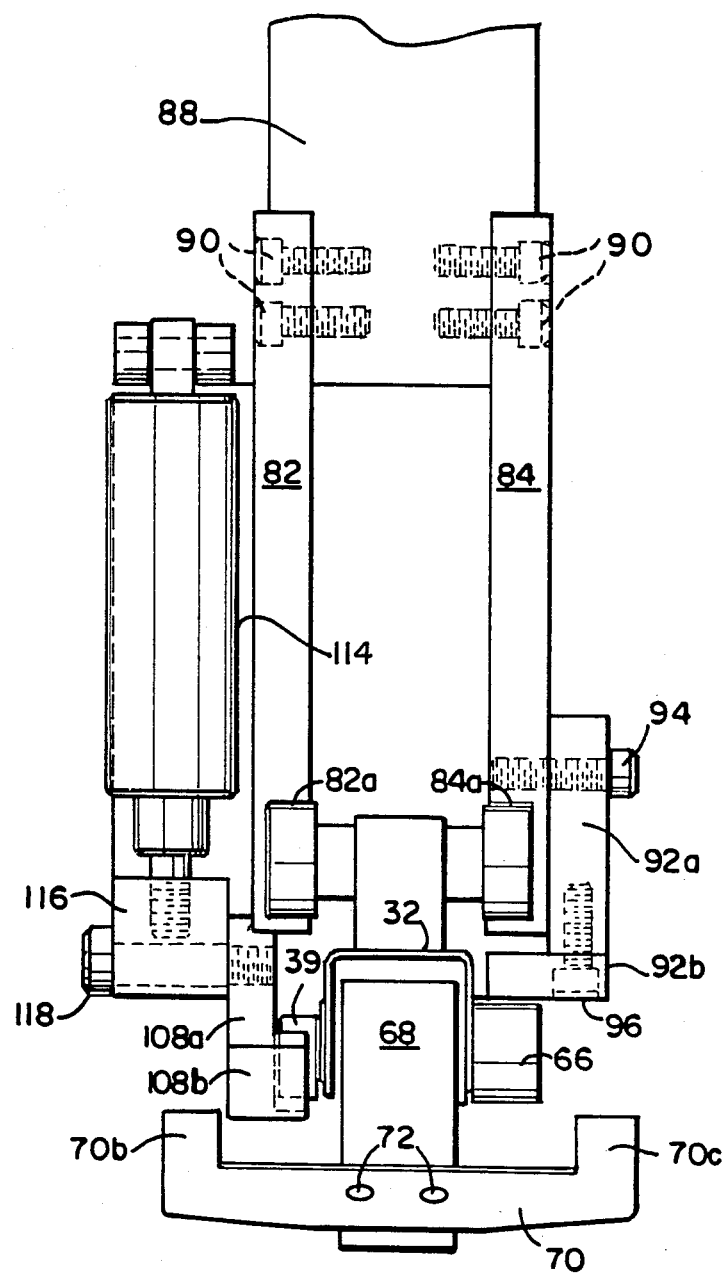
FIG. 6b shows a front elevational view of the pick-up station with the conveyor assembly omitted.
Figure 6C:
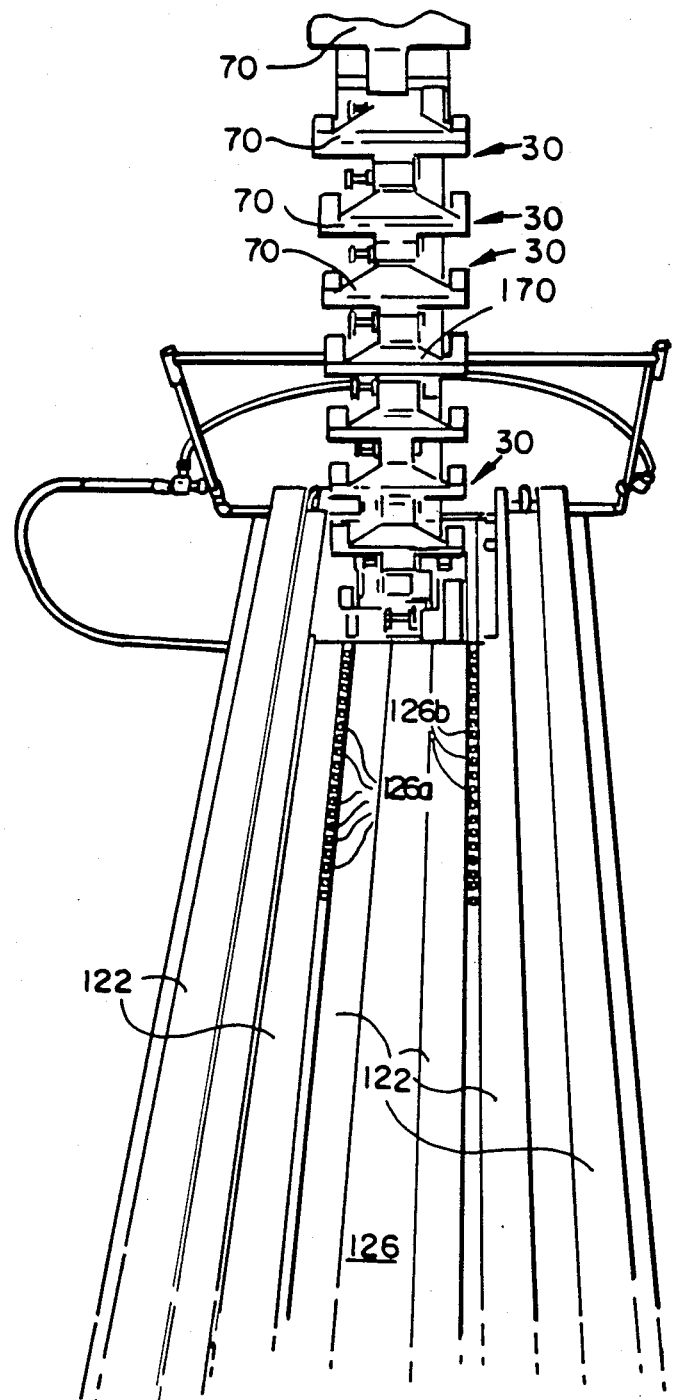

One pick-up station 80 employed for signature pick-up is shown in FIGS. 6a through 6c. The chain conveyor comprised of the links shown and described with respect to FIGS. 1 through 2g, for example, enters into the guide track portion 40' forming part of the pick-up station which is further comprised of a pair of plates 82, 84 whose upper left and right hand corners are joined to vertically aligned plates 86, 88 by fasteners 90, support members 86 and 88 being joined to and forming part of the support frame for the conveyor run, which may be of any desired length and/or contour within the curvature range capability of the chain conveyor. It should be understood that the conveyor chain is comprised of 50 links each having a gripper assembly secured thereto. However, a number of the gripper assemblies have been omitted from FIG. 6a for purposes of simplicity, the actual gripper assemblies shown being selected to provide an understanding of the pick-up technique.

Plates 82 and 84 each have a rectangular-shaped recess 82a, 84a which receive and guide rollers 16, 18, 28 and 29 of the conveyor chain links 10. Additional track sections of the type shown in FIGS. 8a-8c cooperate with track portion 40'.

An opening cam assembly 92 is mounted to the outer surface of plate 84 and is comprised of a mounting bracket 92a secured to plate 84 by fasteners 94. An elongated cam member 92b in the form of a "runner" is joined to bracket 92a by fasteners 96. The opening cam is comprised of a substantially flat elongated surface 92c extending from the right-hand end 92d thereof (see FIG. 6a) toward the left and terminating in a substantially gently curved portion 92e forming a tapered left-hand end.

A closing cam assembly 100, located downstream of the opening cam assembly is comprised of a first mounting bracket 102 joined to plate 82 by fasteners 104, the lower end of bracket 102 extending below the bottom edge of plate 82. A fastening member 106 extends through a suitable opening provided in the portion of the bracket 102 extending below the lower edge of plate 82 and secures the left-hand end of a closing cam member 108 to the lower end of bracket 102.

A horizontal bracket 110 has its left-hand end secured to the top surface of bracket 102 by fastener 112. Horizontally aligned bracket arm 110 extends to the right and is pivotally mounted to the top end 114a of a gas spring 114 having a reciprocating piston rod 114b extending downwardly from the bottom end thereof and mounted within an opening 116a in block 116. A fastener 118 extends through block 116, joining the upper right-hand end of the closing cam 108 thereto. The closing cam has a substantially L-shaped cross-sectional configuration when viewed as shown in FIG. 6a and is comprised of a vertically aligned portion 108a whose lower end is provided with a horizontally aligned portion 108b. The top surface 108c of horizontally aligned portion 108b is diagonally aligned relative to an imaginary horizontal line and cooperates with the lever rollers 66 of each gripper assembly 30 whereby each such roller 66 rolls upwardly along cam surface 108c to close each gripper assembly, as will be more fully described hereinbelow. The upper left-hand portion of the closing cam 108 is pivotally mounted to the lower end of bracket 102 by fastener 106. The upper right-hand end of closing cam bracket 108 is similarly pivotally mounted to block 116 by fastener 118. Gas spring 114 normally urges the right-hand end of cam member 108 upwardly and is yieldable to allow some downward movement of the cam member which compensates for differences in signature thickness without damaging the closing cam assembly.

The pick-up station further includes a conveyor assembly 120 (see FIGS. 6a and 6c) comprised of a plurality of conveyor belts 122 entrained about a downstream roller 124. The upstream roller (not shown) typically provides drive to the conveyor belts 122 whereas the roller 124 is freewheeling. The upper run of the conveyor belts 122 slide along the top surface of a planar, elongated plate 126, whose top surface preferably is treated or otherwise provided to have a low coefficient of sliding friction. A portion of the plate 126 is provided with first and second linear arrays of openings 126a, 126b arranged in spaced parallel fashion, each array being exposed between the edges of a pair of adjacent belts, as shown best in FIG. 3c.

A hollow vacuum box 128, which is closed on all four sides and the bottom thereof, has its upper open end secured to the underside of plate 126 in the region beneath openings 126a, 126b. The bottom end thereof is provided with a coupling 130 which air-tightly joins the delivery end of vacuum hose 132 to vacuum box 128. The vacuum condition from a suitable vacuum source (not shown) draws the signatures S downwardly toward plate 126 thereby drawing the signatures firmly against the conveyor belts 122 and especially the four innermost belts as shown best in FIG. 6c. This vacuum condition assures positive advancement of the signatures toward the pick-up station. Signatures S are shown arranged on the conveyor belt in overlapping fashion with the folded edges comprising the leading edges LE.

The vacuum condition prevents early arriving signatures from slowing down following signatures. For example, let it be assumed that the distance between the folded leading edges of signatures SB and SA is greater than normal (normal spacing is typically in the range of 2"–4"). Signature SB will thus be "early" in entering between the jaws of gripper assembly 30B. As soon as its folded leading edge engages the curved portions 70b-1, 70c-1 of guides 70, signature SB is slowed to the speed of the gripper assembly. The frictional engagement between the top surface of signature SB and the bottom surface of signature SA causes the slowing of signature SB to be imparted to signature SA before SA arrives between the open jaws of 30A, preventing signature SA from properly entering between the open jaws of gripper assembly 30A. The vacuum condition prevents this misfeeding by maintaining signature SA at the conveyor speed even though the early arriving signature SB attempts to apply a frictional drag upon SA.

As was mentioned hereinabove, conveyor belts 122 advance signatures S toward the right as shown by arrow A at a speed faster than movement of the gripper assemblies which also move in the direction shown by arrow A as they round curved portion 40a' of track portion 40' in moving toward the pick-up station.

The pick-up station further includes a pair of plates 93 only of one of which is shown in FIG. 6a in dotted fashion. Each such plate is respectively mounted to the outer surface of plates 82 and 84 and has a curved surface 93a. The aforesaid plates define a "tunnel" through which the gripper assemblies 10 pass as they move between the aforesaid pair of plates. The lower edges of these plates are arranged a spaced distance above the upper surfaces of the signatures S so that the signatures do not normally engage the curved edges 93a. In the event of a build-up or wad or slug of material upon the upper run of the conveyor belts which would cause a jam, said slug, upon passing beneath curved edge 93a, exerts a downward force upon the signatures and hence the conveyor assembly. Roller 124 of the conveyor assembly is supported by a pair of air cylinders such as air cylinder 123, said air cylinders being coupled to opposite ends of the shaft 124a supporting roller 124. In the event of the passage of a slug beneath the curved surfaces 93a, the downward force exerted upon the conveyor is greater than the upward force exerted upon roller shaft 124 by the air cylinders. The force exerted upon the air cylinder piston 123a may be controlled by regulating the air pressure introduced into inlet 123b. When it is desired to lower the conveyor to avoid a jam or for inspection or maintenance purposes, air pressure may be introduced into port 123c and released from port 123b to abruptly lower the conveyor assembly.

The lower ends of cylinders 123 may be pivotally coupled to any suitable stationary frame. Alternatively, the cylinders 123 may be extended upwardly so that their ends 123e are pivotally coupled to the frame supporting the chain conveyor and opening and closing cams which make up the pick-up station.

The operation which takes place at the pick-up station is as follows:

The signatures S and the gripper assemblies 30 (coupled to chain links 10) move substantially parallel to one another once the gripper assemblies 30 round curve portion 40a' as they approach the pick-up station. The conveyor belts 122 move the signatures at a velocity which is greater than the movement of the gripper assemblies 30 as they move parallel to one another. As the gripper assembly 30A rounds curve 40a' it eventually occupies a substantially horizontally aligned position shown by gripper assembly 30B. At this time, the wrap spring 38 (see FIG. 3d) retains the movable jaw 68 in the substantially closed position. At this time, release ring 39 is oriented in the position shown by gripper assemblies 30A and 30B. As gripper assembly 30B moves toward the position occupied by gripper assembly 30C, the surface 39e of the release ring 39 engages curved portion 92e of opening cam surface 92c causing the release ring 39e to move from the position shown by gripper assembly 30B to the position shown by gripper assembly 30C. This counterclockwise rotation of the release ring (relative to FIG. 6a) releases the portion of the wrap spring extending about stationary bushing 33 (see FIG. 3d) enabling the swingable jaw 68 to swing downwardly from the position shown by gripper assembly 30B to the position of the swingable jaw 68 shown in gripper assembly 30C. The location of the opening cam assembly 92 is such that the gripper jaws 37f, 68 are substantially fully open (see gripper assembly 10C) before the leading edge of a signature SC enters into the region between the open jaws 68 and 37f.

The wrap spring of gripper assembly 30C exerts a torque upon its opened lower jaw which urges the jaw downwardly against the surface of the signature SD to assure that the free end of the lower jaw will move into the gap between the top surface of signature SD and the folded leading edge of signature SD. The torque exerted by the wrap spring upon its lower jaw is extremely useful in pressing down a fluffy signature and assuring proper entry of a signature between the jaws of the gripper assembly 30C.

As the signature SC moves toward the right it advances to the position occupied by signature SD, at which time gripper assembly 30C moves to the position occupied by gripper assembly 30D, at which time the leading edge of the signature SD begins to enter into the region between open jaws 68 and 37f.

Signature SD advances to the position occupied by signature SE, at which time gripper assembly 30D advances to the position occupied by gripper assembly 30E. Due to the fact that the signatures S move at a greater linear velocity than the gripper assemblies 30, signature SE moves more deeply into the region between jaws 37f and 68, substantially reaching the curved portions 70b-1, 70c-1 of arms 70b, 70c, respectively (see FIGS. 3a–3c).

As gripper assembly 30E moves to the position occupied by gripper assembly 30F, its roller 66 bears against the closing cam surface 108c causing the left-hand end of lever 60 (see FIGS. 5a and 5b) to be lifted thereby rotating lever 60, shaft 36 and lower jaw 68 clockwise from the position shown by gripper assembly 30E to the position shown by gripper assembly 30F. Rotation of shaft 36 in the clockwise direction (relative to FIG. 6a) is not impeded by the wrap spring 38 which exerts a light holding force upon shaft 36 enabling the movable jaw 68 to be moved upwardly to the closed position without operating release ring 39.

By the time that the jaws 37f and 68 are nearly closed (see gripper assembly 30F) the trailing edge of signature SF has moved beyond the holding influence exerted upon the signature SF by the vacuum openings 126a, 126b. As the gripper assembly 30F moves beyond closing cam surface 108c, the chain link upon which the gripper assembly is mounted enters into curved portion 40b' of track 40' wherein each link 10 and its associated gripper assembly 30 is caused to move along a curved path extending between imaginary lines C and D. At this time, each gripper assembly causes the signature which it is carrying to be accelerated due to the abrupt change in direction of the chain conveyor. Each accelerated signature accelerates the next upstream signature resting upon it, thus further assuring that such next upstream signature enters deeply into the region between the open jaws of the next upstream gripper assembly, thereby further facilitating the entry of each signature into a gripper assembly in a properly aligned manner. For example, it can be seen that the jaws 37 of gripper assembly 30F are nearly closed. These jaws firmly grip signature SF as roller 66 leaves the influence of closing cam surface 108c. At the same time, the chain conveyor link supporting gripper assembly 30F enters into the curved portion 40b' of track 40' whereupon signature SF is abruptly accelerated. As will be noted, the trailing edge of signature SF has cleared the vacuum openings 126a, 126b, reducing the influence of conveyor belts 122 upon signature SF thereby enabling signature SF to undergo acceleration unimpeded by the conveyor belts 122 enabling the signature to slide relative to belts 122. The surfaces of signature SE and signature SF engage one another to impart acceleration to signature SE assuring that signature SE deeply enters into the region between the open jaws 37f and 68 and assuring that its folded leading edge will engage the curved portion of guide arm 70a, 70b and be properly aligned within the gripper assembly 30E.

The wrap spring 38 retains the jaws of each gripper assembly such as, for example, gripper assemblies 30G and 30H, in the closed position, even though the lever roller 66 of these gripper assemblies have cleared closing cam surface 108c, thus assuring that the gripper assemblies will remain closed and tightly grip an associated signature as it is moved along the conveyor path until it is desired to drop the signature at a particular station.

Figure 8C:
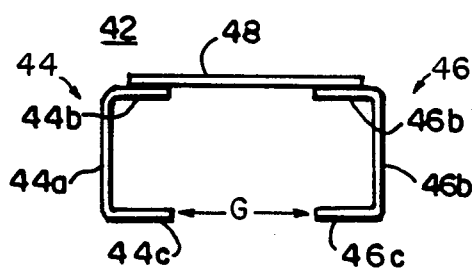
Figure 9:
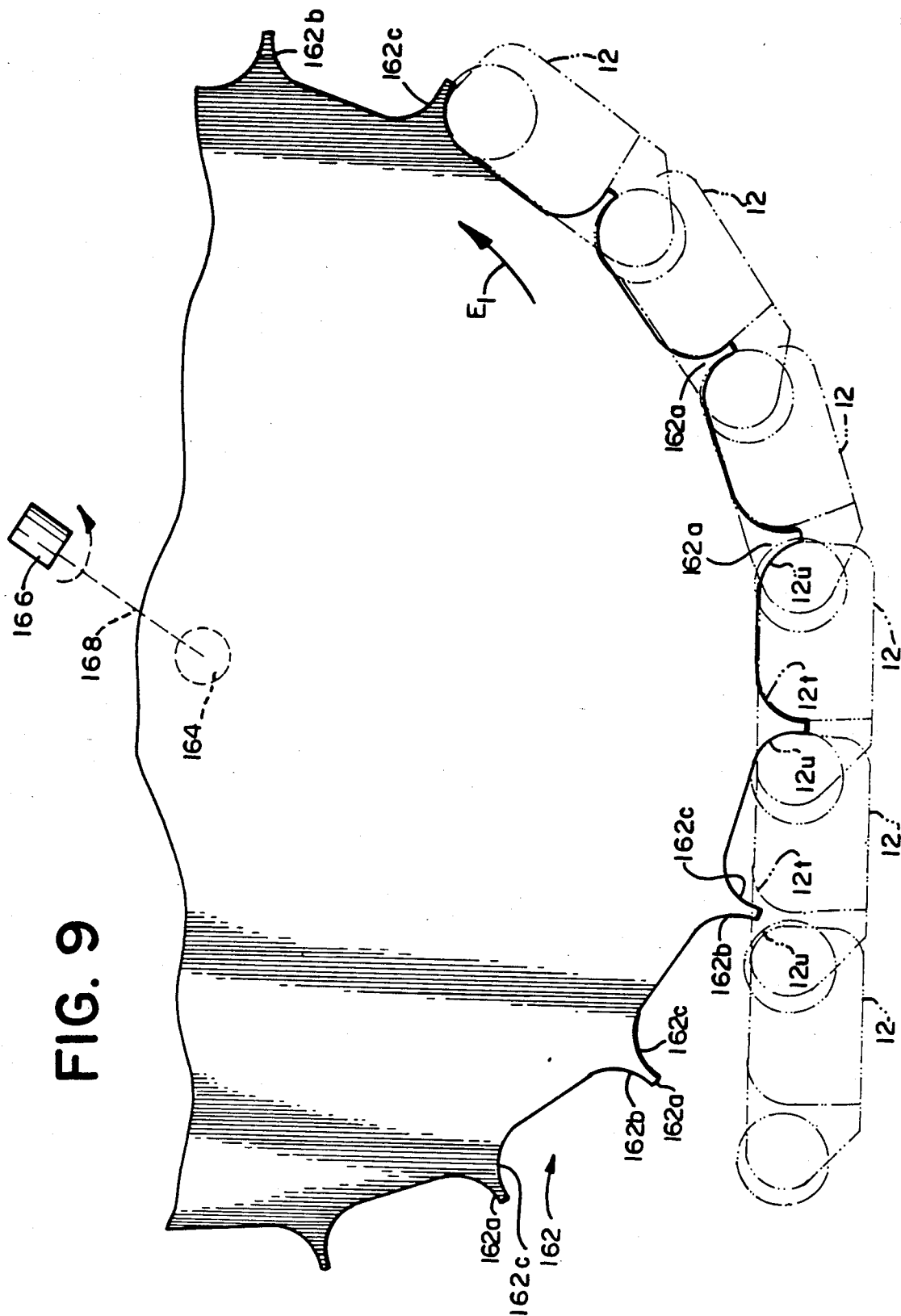
FIG. 9 shows a chain drive sprocket for driving the drive chain of FIG. 1.

Track sections as shown in FIGS. 8a–8c are coupled to the section 40' such as, for example, by a bracket B.

Figure 7A:
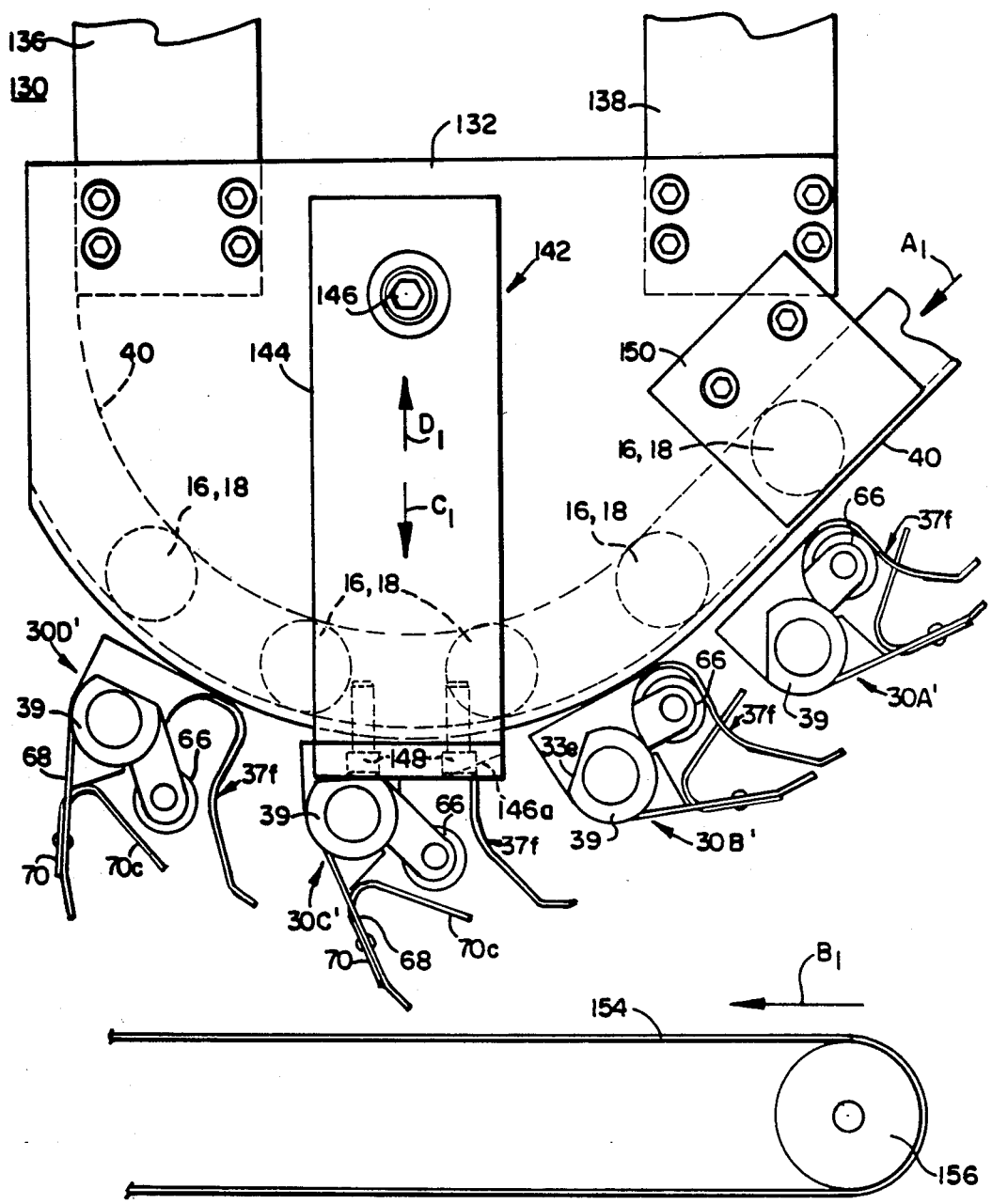
FIG. 7a shows a side elevation of a drop station employing the chain and gripper assemblies of FIGS. 1 through 5.
Figure 7B:
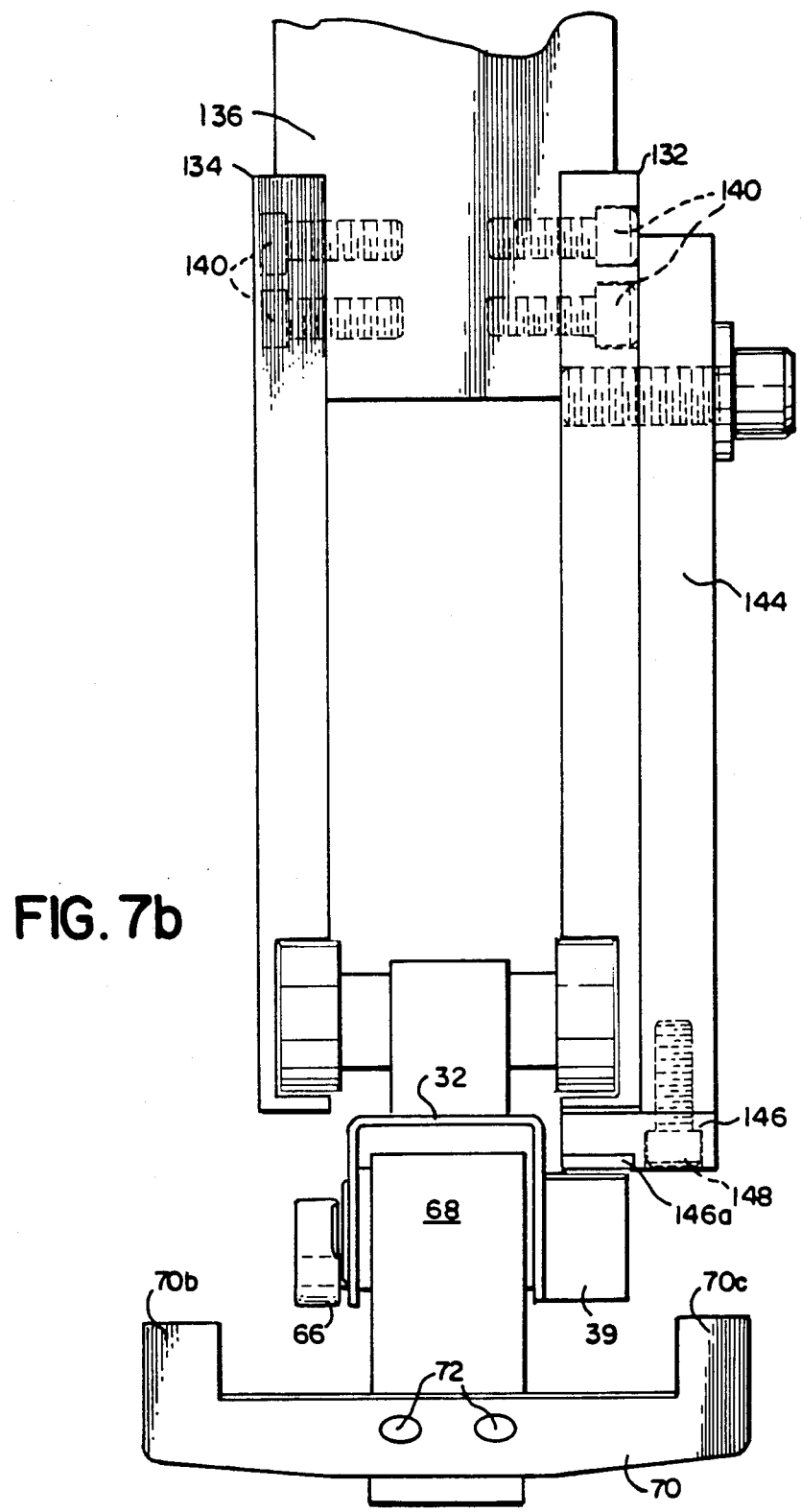

FIGS. 7a and 7b show a drop station 130 comprised of a pair of plates 132, 134 joined to a pair of frame members 136, 138 forming a part of the conveyor system frame. Fasteners 140 secure plates 132 and 134 to frame members 136 and 138.

Plates 132 and 134 have curved bottom portions and are each provided with curved recesses 132a, 134a of rectangular cross-section defining a track 40 for slidably receiving and guiding the vertically aligned rollers 16 and 18 of each link 10 in the chain conveyor. Drive means (not shown) are provided to move the chain conveyor in the direction shown by arrow A1. For purposes of simplicity, signatures have been omitted from FIGS. 7a and 7b, it being understood that each of the gripper assemblies in the closed position contain and grip signatures in the manner shown, for example, by gripper assemblies 10G and 10H in FIG. 6a.

An opening cam assembly 142 is comprised of bracket 144 whose upper end is mounted to plate 132 by fastener 146. The lower portion of bracket 144 extends below the curved lower edge of plates 132 and 134 and has a horizontally aligned opening cam member 146 joined thereto by fastening members 148.

A portion 146a of the bottom surface of cam member 146 is curved as shown best in FIG. 7a. The operation which takes place at the drop station is as follows:

As each gripper assembly, such as for example gripper assembly 30A', nears the drop station, it moves out of track 40, whose left-hand end is joined to plate 132 by bracket 150, and enters into the guide track formed by recesses 132a, 134a causing the links and gripper assemblies to move along a curved path. Gripper assembly 30A' subsequently moves the position occupied by gripper assembly 30B'. As the gripper assembly 30B' moves toward the position occupied by gripper assembly 30C', surface 39e of release ring 39 engages opening cam surface 146a causing release ring 39 to rotate clockwise, relative to FIG. 7a, from the position occupied by the release ring of gripper assembly 30B' to the position occupied by the release ring of gripper assembly 30C'. The groove 39a of release ring 39 (see FIG. 4a) urges the projection 38a of the wrap spring 38 in the direction which causes the wrap spring to unwrap from bushing 33 (see FIG. 3d) thereby enabling lower jaw 68 to swing downwardly to the open position and drop the signature being gripped upon a conveyor, for example, as shown by conveyor belts 154 extending about roller 156 and whose upper run moves in the direction shown by arrow B1. The wrap spring functions to retain the lower jaw 68 in the open position even after the release ring 39 moves beyond the opening cam surface 146a, as shown by gripper assembly 30D'. This feature is of significant value when it is desirable to open only selected ones of the gripper assemblies which is accomplished by replacing bracket 144 with either a pneumatically-operated or solenoid-operated reciprocating arm who lower end carries opening cam surface 146a. For example, assuming that it is desired that only every other gripper assembly be open, the pneumatically or solenoid-operated reciprocating arm is moved downwardly as shown by arrow C1 so that opening cam surface 146a occupies the position shown in FIG. 7a, thereby causing gripper assembly 30C', for example, to open. The reciprocating member is then moved upwardly in rapid fashion so that closing cam surface 146a is displaced upwardly by a distance sufficient to prevent the release ring 39 of gripper assembly 30B' from experiencing any movement, as it passes the opening cam, thus enabling the gripper assembly 30B' to remain closed under control of its wrap spring and to move its gripped signature (not shown) to another drop station (not shown).

As soon as the gripper assembly 30B' moves to and beyond the position occupied by gripper assembly 30C', so that its release ring 39 has cleared the left-hand end of the opening cam surface 146a, the cam activating means is again operated to urge the reciprocating closing cam surface downwardly so that the closing cam surface 146a will engage the release ring 39 of the gripper assembly 30A' as it passes the closing cam. The wrap spring 38 operates to retain each gripper assembly 30 in the open position once it has been moved thereto due to the interaction between the opening cam surface 146a and release ring 39. The light force exerted by the wrap spring upon shaft 36 will retain the movable jaw 68 in the open position until it is again moved to the closed position by engagement of the lever arm roller 66 with a closing cam surface, such as for example, the closing cam surface 108c shown in FIG. 6a.

Drive is imparted to the chain conveyor by means of a drive sprocket 162 shown in FIG. 8. Only a portion of sprocket 162 has been shown for purposes of simplicity.

The sprocket is mounted upon a shaft 164 which is mechanically coupled to drive means 166 as represented by dotted line 168. Drive means 166 may be a motor directly coupled to shaft 164 or a motor coupled to shaft 164 through a suitable gear box which typically provides a speed adjustment.

Sprocket 162 is provided with teeth 162a defined by curved sides 162b, 162c forming a tapered, truncated tooth terminating in flat surface 162d. Sprocket 162 rotates counterclockwise as shown by arrow E1. Each tooth enters into the region between adjacent interconnected chain links and so that curved surface 162c engages the conforming curved surface 12t formed in each body member 12 of a chain link 10. Note especially FIGS. 2g and 8. The projection 12a of each link body member 12 has a curved upper portion 12u as shown best, for example, in FIGS. 2b, 2g and 8, enabling a tooth 162a to enter into the region between a pair of adjacent link body members and thereby urge the chain link body member engaged by surface 162c to be moved in the direction shown by arrow E1 of FIG. 8.

If desired, sprocket 162 may be rotated in the reverse direction so that surface 162b of each tooth is urged against projection 12a to move the conveyor chain in the reverse direction. However, it should be understood that the gripper assemblies 30 must be rotated 180° about the axis of their threaded members 34 to accomodate the pickup and drop off of signatures. It should further be noted that the chain link body members cooperate with the gripper assembly to enable the gripper assembly to be mounted upon a body member in a 180° orientation relative to the mountings shown, for example, in FIGS. 3a–3c, if desired.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A pick-up station for picking up signatures from a signature stream for delivery to a remote location comprising:

an elongated supporting conveyor having a substantially straight upper run for advancing a stream of signatures arranged in overlapping fashion toward and through the region of a pick-up station;
a conveyor chain comprised of interconnecting links;
means for moving said conveyor chain;
a gripper assembly secured to selected ones of said interconnecting links, each gripper assembly having a pair of movable jaws;
rotatably mounted opening means for moving said movable jaws to an open position when rotated in a first direction;
rotatably mounted closing means spaced from said opening means for moving said movable jaws to a closed position when rotated to move in a second direction opposite said first direction;
each of said links having guide rollers;
guide means engaged by said guide rollers for moving said conveyor chain along a substantially straight path substantially parallel to said substantially straight upper run for advancing said conveyor chain and each gripper assembly through said pick-up station and in close proximity to said supporting conveyor;
an opening cam having a cam surface of predetermined length engaging the opening means of each gripper assembly as it passes said opening cam to move one of said pair of movable jaws into sliding engagement with an upper surface of an associated signature moving along said conveyor;
a separate, independent closing cam positioned a predetermined distance downstream relative to said opening cam and having a cam surface of a predetermined length which is rollingly engaged by the closing means of each gripper assembly as it passes the closing cam surface and after the opening means leaves the influence of said opening cam;
said supporting conveyor including means for moving said signature stream at a first velocity which is greater than the movement of each gripper assembly as the signatures pass through the pick-up station causing the jaw of each gripper assembly in sliding engagement with an associated signature to be guided by said associated signature beneath the next upstream signature whereby the leading edge of each signature in said stream enters into a region between the open jaws of an associated gripper assembly prior to the closing of said jaws of each gripper assembly by said closing cam.

2. The apparatus of claim 1 wherein said guide means include means for moving said conveyor chain in such a manner as to accelerate each signature as it is clamped to impart said acceleration to the signatures of the signature stream resting on the clamped signatures to facilitate the entry of said next succeeding upstream signatures into the region between the movable jaws of the associated next succeeding upstream gripper assemblies.

3. The apparatus of claim 1 wherein said moving means further comprises drive means for said conveyor chain including a drive motor and sprocket means coupled thereto;

said sprocket means having teeth with curved sides for entry into the region between innerconnected links;
the adjacent surfaces of the innerconnecting links having a curvature conforming to the curvature on opposing sides of said sprocket teeth.

4. A pick-up station according to claim 1 wherein each of said gripper assemblies further comprise means for retaining said jaws in the position to which they are moved by said opening cam after said opening means moves away from said opening cam.

5. A pick-up station according to claim 1 wherein each of said gripper assemblies further comprise means for retaining said jaws in the position to which they are moved by said closing cam after said closing means moves away from said closing cam.

6. A pick-up station according to claim 1 further comprising means for accelerating each gripper assembly after its closing means passes beyond said closing cam.

7. A pick-up station according to claim 1 wherein said opening cam urges one of said jaws downwardly to rest upon the surface of a signature whose leading edge is downstream relative to the jaw resting thereon to facilitate entry of the next upstream signature resting upon the top surface of said last mentioned signature into the last mentioned open jaw.

8. A pick-up station according to claim 1 wherein said opening and closing means are on opposite sides of said gripper assembly.

9. A pick-up station according to claim 1 further comprising means for resiliently mounting said closing cam to facilitate changes in thickness of a signature gripped between the jaws of a gripper assembly.

10. The apparatus of claim 1 wherein the signatures upon said substantially straight upper run passing into and through the pick-up station have their downstream ends engaging the surface of the next downstream signature just prior to entering the open jaws of a gripper assembly.

11. A pick-up station for picking up signatures from a signature stream for delivery to a remote location comprising:
  an elongated supporting conveyor having an upper run for advancing a stream of signatures arranged in overlapping fashion toward a pick-up station;
  a conveyor chain comprised of interconnecting links;
  means for moving said conveyor chain;
  a gripper assembly secured to selected ones of said interconnecting links, each gripper assembly having a pair of movable jaws;
  rotatably mounted opening means for moving said movable jaws to an open position when rotated in a first direction;
  rotatably mounted closing means spaced from said opening means for moving said movable jaws to a closed position when rotated to move in a second direction opposite said first direction;
  each of said links having guide rollers;
  guide means engaged by said guide rollers for moving said conveyor chain along a path for advancing said conveyor chain and each gripper assembly through said pick-up station and in close proximity to said supporting conveyor;
  an opening cam having a cam surface of predetermined length engaging the opening means of each gripper assembly as it passes said opening cam;
  a separate, independent closing cam positioned a predetermined distance downstream relative to said opening cam and having a cam surface of a predetermined length which is rollingly engaged by the closing means of each gripper assembly as it passes the closing cam surface and after the opening means leaves the influence of said opening cam;
  said supporting conveyor including means for moving said signature stream at a first velocity which is greater than the movement of each gripper assembly as the signatures pass through the pick-up station whereby the leading edge of each signature in said stream enters into a region between the open jaws of an associated gripper assembly prior to the closing of said jaws of each gripper assembly by said closing cam;
  said conveyor further including a belt supporting member and a plurality of conveyor belts each having an upper run slidably engaging the top surface of said belt supporting member and moving at said first velocity along said top surface;
  said supporting surface having a plurality of openings;
  vacuum means for drawing a vacuum at each of said openings in the region of said pick-up station to enhance the movement imparted to said signatures by said conveyor belts.

12. The apparatus of claim 11 wherein said openings terminate at a location which assures that signatures moving along said conveyor belts have cleared said vacuum openings after entry into the region between a pair of open jaws and before being clamped between a pair of jaws by said closing cam.

13. A pick-up station according to claim 11 wherein said supporting surface is a substantially flat elongated surface;
  said opening cam causing one of the movable jaws to slidably engage the top surface of a signature as it moves along said flat elongated surface due to engagement of said opening means by said opening cam, the top surface of the signature upon which the jaw member rests serving to facilitate the entry of the next upstream signature into the region between the open jaws of the gripper assembly.

14. A pick-up station for picking up signatures from a signature stream for delivery to a remote location comprising:
  an elongated supporting conveyor having an upper run for advancing a stream of signatures arranged in overlapping fashion toward a pick-up station;
  a conveyor chain comprised of interconnecting links;
  means for moving said conveyor chain;
  a gripper assembly secured to selected ones of said interconnecting links, each gripper assembly having a pair of movable jaws;
  rotatably mounted opening means for moving said movable jaws to an open position when rotated in a first direction;
  rotatably mounted closing means spaced from said opening means for moving said movable jaws to a closed position when rotated to move in a second direction opposite said first direction;
  each of said links having guide rollers;
  guide means engaged by said guide rollers for moving said conveyor chain along a path for advancing said conveyor chain and each gripper assembly through said pick-up station and in close proximity to said supporting conveyor;
  an opening cam having a cam surface of predetermined length engaging the opening means of each gripper assembly as it passes said opening cam;
  a separate, independent closing cam positioned a predetermined distance downstream relative to said opening cam and having a cam surface of a predetermined length which is rollingly engaged by the closing means of each gripper assembly as it passes the closing cam surface and after the opening means leaves the influence of said opening cam;
  said supporting conveyor including means for moving said signature stream at a first velocity which is greater than the movement of each gripper assembly as the signatures pass through the pick-up station whereby the leading edge of each signature in said stream enters into a region between the open jaws of an associated gripper assembly prior to the closing of said jaws of each gripper assembly by said closing cam;
  each of said gripper assemblies selective retaining means further comprising clutch means for imparting a substantial locking force upon each movable jaw when in an engaged condition and said opening means comprising a release ring for disengaging the clutch means when the release ring is rotated by said opening cam.

15. The apparatus of claim 14 wherein said clutch means includes means for exerting a torque upon said gripper assembly which serves to compress the downstream signature when the gripper assembly is in the open position to assure proper entry of the leading edge of the next downstream signature into the region between said open jaws.

16. The apparatus of claim 15 wherein said clutch means comprises a wrap spring;

said movable jaw being mounted upon a shaft rotatably supported by said stationary jaw; a projection means mounted on said stationary jaw member and surrounding a portion of said shaft; said wrap spring being wrapped about said projection and said shaft; one end of said wrap spring being coupled to said release ring to release said wrap spring from said projection to permit said movable pin to rotate to the open position.

17. A pick-up station according to claim 14 wherein said clutch means further includes means for exerting a strong force against rotation of said movable jaw in a first direction toward the open position and for exerting a weak force upon said movable jaw when rotated in a second direction toward to the closed position.

18. A pick-up station for picking up signatures from a signature stream for delivery to a remote location comprising:

an elongated supporting conveyor having an upper run for advancing a stream of signatures arranged in overlapping fashion toward a pick-up station;
a conveyor chain comprised of interconnecting links;
means for moving said conveyor chain;
a gripper assembly secured to selected ones of said interconnecting links, each gripper assembly having a pair of movable jaws;
rotatably mounted opening means for moving said movable jaws to an open position when rotated in a first direction;
rotatably mounted closing means spaced from said opening means for moving said movable jaws to a closed position when rotated to move in a second direction opposite said first direction;
each of said links having guide rollers;
guide means engaged by said guide rollers for moving said conveyor chain along a path for advancing said conveyor chain and each gripper assembly through said pick-up station and in close proximity to said supporting conveyor;
an opening cam having a cam surface of predetermined length engaging the opening means of each gripper assembly as it passes said opening cam;
a separate, independent closing cam positioned a predetermined distance downstream relative to said opening cam and having a cam surface of a predetermined length which is rollingly engaged by the closing means of each gripper assembly as it passes the closing cam surface and after the opening means leaves the influence of said opening cam;
said supporting conveyor including means for moving said signature stream at a first velocity which is greater than the movement of each gripper assembly as the signatures pass through the pick-up station whereby the leading edge of each signature in said stream enters into a region between the open jaws of an associated gripper assembly prior to the closing of said jaws of each gripper assembly by said closing cam;
and further comprising means for resiliently mounting the portion of the conveyor positioned adjacent to the pick-up station; and
stationary guide means positioned upstream relative to said pick-up station and extending beyond the gripper assemblies and being normally displaced a predetermined distance from the adjacent surfaces of the signatures in the signature stream moving adjacent thereto and for exerting a force upon said signature stream and conveyor means for overcoming the holding force of said means for resiliently mounting upon the occurrence of a significant increase in stream thickness to enable the conveyor to move downwardly to prevent damage to the pick-up station due to the occurrence of a build-up or wad of signatures upon said conveyor.

19. The apparatus of claim 18 wherein said means for resiliently mounting comprise air cylinders.

20. The apparatus of claim 19 further comprising means for operating said air cylinders to lower said conveyor means due to the occurrence of a jam or for inspection and/or maintenance purposes.

* * * * *

UNITED STATES PATENT AND TRADEMARK OFFICE
CERTIFICATE OF CORRECTION

PATENT NO. : 4,905,818

DATED : March 6, 1990

INVENTOR(S) : J. D. Houseman

It is certified that error appears in the above-identified patent and that said Letters Patent is hereby corrected as shown below:

Column 5, line 44, "33" should be --33a--

Column 5, line 55, "33" should be --33a--

Column 5, lines 61-62, "Cyclindrical" should be --Cylindrical--

Column 5, line 67, "33" should be --33a--

Column 6, line 2, "33" should be --33a--

Column 6, line 30, "33" should be --33a--

Column 9, line 29, delete first occurrence of "of"

Column 12, line 33, "who" should be --whose--

Signed and Sealed this

Tenth Day of September, 1991

Attest:

HARRY F. MANBECK, JR.

Attesting Officer

Commissioner of Patents and Trademarks